United States Patent
Miyazawa

(10) Patent No.: US 7,515,946 B2
(45) Date of Patent: Apr. 7, 2009

(54) SEMICONDUCTOR DEVICE AND CONTROL METHOD FOR POWER SAVING

(75) Inventor: Naoyuki Miyazawa, Yamanashi (JP)

(73) Assignee: Eudyna Devices Inc., Yamanashi (JP)

( * ) Notice: Subject to any disclaimer, the term of this patent is extended or adjusted under 35 U.S.C. 154(b) by 537 days.

(21) Appl. No.: 11/200,145

(22) Filed: Aug. 10, 2005

(65) Prior Publication Data
US 2006/0035683 A1 Feb. 16, 2006

(30) Foreign Application Priority Data
Aug. 12, 2004 (JP) ............................. 2004-235552

(51) Int. Cl.
*H04B 1/16* (2006.01)

(52) U.S. Cl. .................................. 455/574; 455/343.1
(58) Field of Classification Search .................. None
See application file for complete search history.

(56) References Cited

FOREIGN PATENT DOCUMENTS

JP 59009729 1/1984

*Primary Examiner*—Thanh C Le
(74) *Attorney, Agent, or Firm*—Westerman, Hattori, Daniels & Adrian, LLP.

(57) ABSTRACT

A semiconductor device includes a decoder decoding input signals and generating a control signal from decoded input signals, and a power control circuit detecting a given combination of the input signals applied to the decoder and controlling a supply of power to the decoder.

14 Claims, 7 Drawing Sheets

Fig. 2
PRIOR ART

| INPUT 1 | INPUT 2 | INPUT 1 | RF1-COMMON | RF2-COMMON | RF3-COMMON | RF4-COMMON | RF5-COMMON | RF6-COMMON | Vdd | Idd |
|---|---|---|---|---|---|---|---|---|---|---|
| H | H | H | on | off | off | off | off | off | 3V | 1mA |
| H | H | L | off | on | off | off | off | off | 3V | 1mA |
| H | L | H | off | off | on | off | off | off | 3V | 1mA |
| H | L | L | off | off | off | on | off | off | 3V | 1mA |
| L | H | H | off | off | off | off | on | off | 3V | 1mA |
| L | H | L | off | off | off | off | off | on | 3V | 1mA |
| L | L | H |  |  |  |  |  |  |  |  |
| L | L | L |  |  |  |  |  |  |  |  |

Fig. 4

| | INPUT 1 | INPUT 2 | INPUT 3 | RF1-COMMON | RF2-COMMON | RF3-COMMON | RF4-COMMON | RF5-COMMON | RF6-COMMON | Vdd | Idd |
|---|---|---|---|---|---|---|---|---|---|---|---|
| (1) | H | H | H | on | off | off | off | off | off | 3V | 1mA |
| (2) | H | H | L | off | on | off | off | off | off | 3V | 1mA |
| (3) | H | L | H | off | off | on | off | off | off | 3V | 1mA |
| (4) | H | L | L | off | off | off | on | off | off | 3V | 1mA |
| (5) | L | H | H | off | off | off | off | on | off | 3V | 1mA |
| (6) | L | H | L | off | off | off | off | off | on | 3V | 1mA |
| (7) | L | L | H | NOT IN USE | | | | | | | |
| (8) | L | L | L | DISCONNECT | | | | | | 3V | 0.05 mA |

SEMICONDUCTOR DEVICE AND CONTROL METHOD FOR POWER SAVING

BACKGROUND OF THE INVENTION

1. Field of the Invention

The present invention generally relates to semiconductor devices and methods for controlling power saving.

2. Description of the Related Art

Generally, a portable phone equipped with an antenna switch semiconductor circuit has an increased number of control input terminals for operation controls as the number of ports branched increases. For example, an SP6T (single pole six through) switch has a large number of terminals including six control terminals in addition to seven RF (Radio Frequency) terminals, and has a difficulty in downsizing.

Further, there is a difficulty in layout design on a printed circuit board built in the portable phone because a large area is occupied to arrange the six control terminals in addition to the seven RF terminals. A reduced number of control terminals is needed to meet the demands of further downsizing. A decoder may be used for the purpose of further downsizing. The decoder may decodes input signals received via input terminals and outputs the original data via control output terminals.

For example, a 3-to-8 bit decoder has eight input conditions and is capable of decoding an input signal applied to three input terminals to a signal output via six output terminals. The use of the decoder makes it possible to produce the eight-bit output from the three-bit input, and reduces the number of input terminals to three. If the decoder is not used, six input terminals are needed to receive the six control signals. In some cases, the 3-to-8 bit decoder is incorporated, together with the switch, into a switch module in order to reduce the number of input terminals.

The decoder may be implemented by devices in which little standby current flows, such as CMOS (Complementary Metal Oxide Semiconductor) devices. The decoder is frequently incorporated into a GaAs switch in terms of miniaturization and cost reduction.

FIG. 1 shows a conventional switch module. Referring to FIG. 1, a switch module 1 includes a switch circuit 2 having multiple FETs (Field Effect Transistors), a decoder 3, input terminals 41 through 43, a power supply terminal 5, a ground (GND) terminal 6, an RF common terminal 7, and RF terminals 81 through 86. The switch circuit 2 and the decoder 3 are formed by GaAs devices.

FIG. 2 shows the truth table of the conventional switch module. Referring to FIG. 2, inputs 1 through 3 are signals applied to the input terminals 41 through 43, respectively. RF1-Common through RF6-Common indicate the connecting relationships between the RF common terminal 7 and the RF terminals 81 through 86. A symbol Vdd denotes a voltage applied to the power supply terminal 5. A symbol Idd denotes a statically consumed current that flows from the power supply terminal 5 to the ground terminal 6.

Each of the input signals applied to the input terminals 41 through 43 may be at either HIGH or LOW. The decoder 3 decodes the input signals, and applies decoded signals to the gates of the FETs of the switch circuit 2. The RF common terminal 7 is selectively connected to the RF terminals 81 through 86 based on the states of the FETs. The voltage Vdd applied to the decoder 3 formed by GaAs devices makes continuity between the power supply terminal 5 and the ground conduct, and causes the statically current Idd to flow statically because the decoder 3 does not have any CMOS device composed of an nMOS transistor and a pMOS transistor. Thus, power consumption cannot be reduced.

SUMMARY OF THE INVENTION

The present invention has been made in view of the above circumstances and provides a semiconductor device having reduced power consumption and a control method for power saving.

According to an aspect of the present invention, there is provided a semiconductor device comprising: a decoder decoding input signals and generating a control signal from decoded input signals; and a power control circuit detecting a given combination of the input signals applied to the decoder and controlling a supply of power to the decoder.

According to another aspect of the present invention, there is provided a method of controlling a semiconductor device comprising the steps of: detecting a given combination of input signals applied to a decoder; and controlling a supply of power to the decoder when the given combination of input signals is detected.

BRIEF DESCRIPTION OF THE DRAWINGS

Other features, functions and advantages of the present invention will become more detailed description when read in conjunction with the accompanying drawings, in which:

FIG. 2 shows the truth table of the conventional switch module;

FIG. 4 shows the truth table of the semiconductor device according to the first embodiment of the present invention;

DESCRIPTION OF THE PREFERRED EMBODIMENTS

A description will now be given, with reference to the accompanying drawings, of preferred embodiments of the present invention.

First Embodiment

Figure 1:
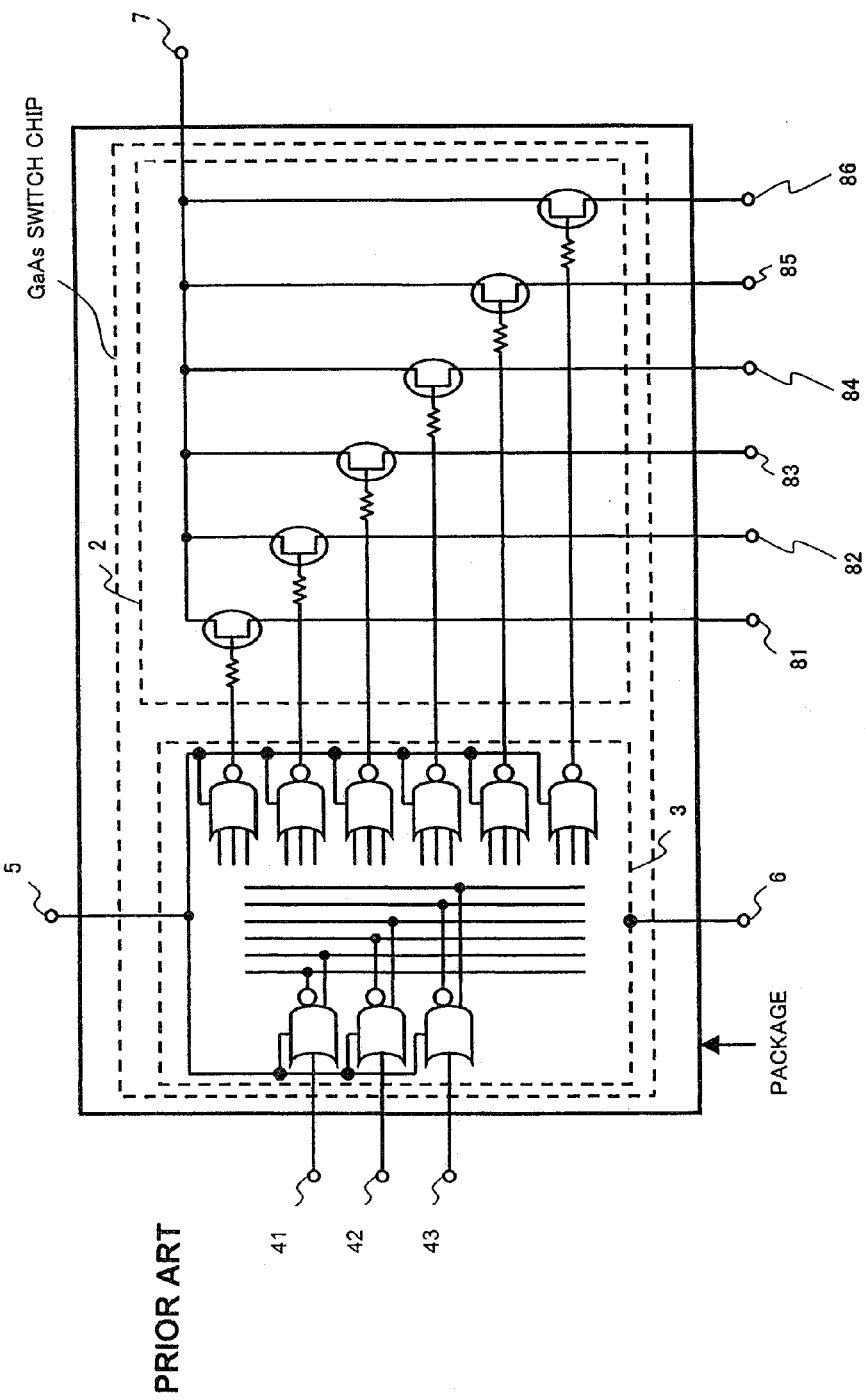
FIG. 1 is a block diagram of a conventional switch module.
Figure 3:
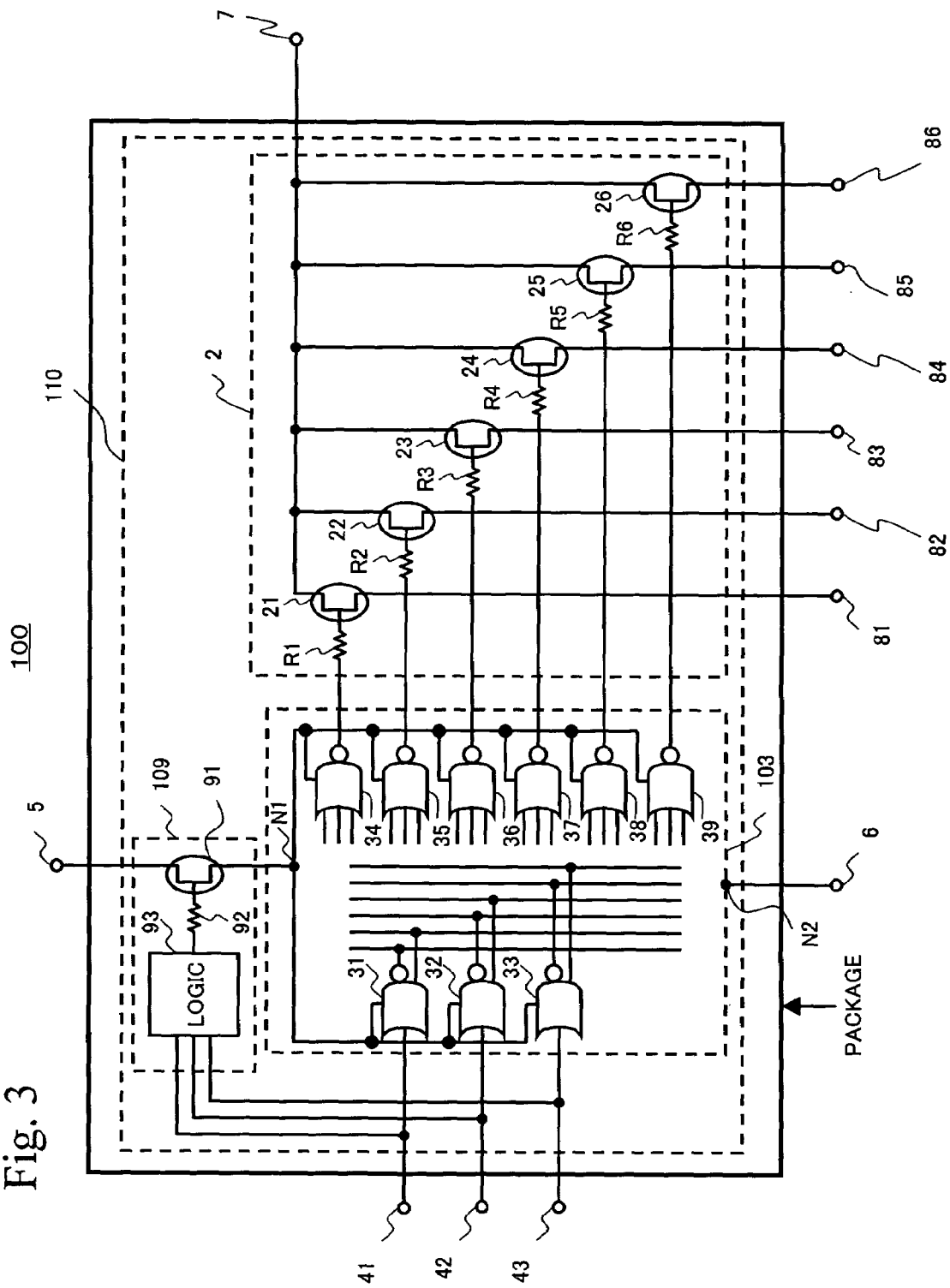
FIG. 3 is a block diagram of a semiconductor device according to a first embodiment of the present invention.

FIG. 3 is a block diagram of a semiconductor device according to a first embodiment of the present invention, in which parts that are the same as those shown in the previously described figures are given the same reference numerals as previously. A semiconductor device 100 includes the switch circuit 2, a decoder 103, the input terminals 41 through 43, the power supply terminal 5, the ground terminal 6, the RF common terminal 7, and the RF terminals 81 through 86. These structural parts are incorporated in a package.

The semiconductor device 100 functions as an antenna switch. The power supply terminal 5 is supplied with the power supply voltage Vdd that drives the decoder 103. The switch circuit 2 includes the RF common terminal (first terminal) 7, the multiple FETs (switch transistors) 21 through 26, and resistors R1 through R6. The gates of the FETs 21 through 26 are controlled by outputs of the decoder 103. The RF terminals 81 through 86 are assigned to transmission or reception. The selected one of the FETs 21 through 26 connects the corresponding one of the RF terminals 81 through 86 to the RF common terminal 7.

The decoder 103 includes OR/NOR circuits 31 through 33, and NOR circuits 34 through 39, and is connected in parallel between the power supply terminal 5 and the ground terminal 6. The decoder 103 decodes the combinations of the input signals on the input terminals 41 through 43, and produces resultant output signals. The OR/NOR circuits 31 through 33 are connected in parallel between a node (power supply terminal of the decoder 103) N1 provided on the side of the power supply terminal 5 and a node N2 provided on the side of the ground terminal 6. The OR/NOR circuits 31 through 33 are supplied with the signals applied to the input terminals 41 through 43. The outputs of the OR/NOR circuits 31 through 33 are connected to an internal data bus. The NOR circuits 34 through 39 are connected between the node N1 and the node N2, and are supplied with signals on the internal data bus. The outputs of the NOR circuits 34 through 39 are connected to the gates of the FETs 21 through 26, respectively. The decoder 103 may be formed by MESFETs of GaAs. The decoder 103 may have the 3-to-8 bit structure. Alternatively, a 4-to-16 bit decoder may be used. The number of output terminals of the decoder is equal to the nth power of 2.

A power control circuit 109 includes a drain switch FET 91, a resistor 92 and a logic circuit 93 functioning as a generator circuit. The power control circuit 109 may be formed by MESFETs of GaAs, and is connected between the input terminals 41 and 43 and the decoder 103 in parallel. The power control circuit 109 may disconnect the path between the power supply terminal 5 and the decoder 103. The power control circuit 109 may reduce the bias applied to the decoder 103. The power control circuit 109 disconnects the power supply terminal 5 from the decoder 103 in response to the input signal that defines the condition for standby mode. Thus, the statically current consumed in the decoder 103 can be reduced in the standby mode. The decrease in the power supply voltage by the power control circuit 109 may be implemented by disconnecting the power supply terminal 5 and the decoder 103 from each other. A leakage current may be flow through the drain switch FET 91 of the power control circuit 109 in the case of disconnecting.

Metal interconnection lines or bonding wires may be used to connect the power control circuit 109 between the input terminals 41-43 and the decoder 103. It may be determined whether the power control circuit 109 may optionally be used or not by wire bonding.

The drain switch FET 91 may cutoff the connection between the power supply terminal 5 and the decoder 103. The drain of the drain switch FET 91 is connected to the power supply terminal 5, and the source thereof is connected to the decoder 103, the gate being coupled to the logic circuit 93 via the resistor 92.

The logic circuit 93 produces the control signal that controls the gate of the drain switch FET 91 when an undefined combination among the combinations of the signals applied to the input terminals 41 through 43 decoded by the decoder 103. Thus, power consumption can be reduced by using the logic circuit 93 capable of producing the control signal for controlling the gate of the drain switch FET 91 on the basis of the signals applied to the input terminals 41 through 43 without increasing the number of input terminals.

When the drain switch FET 91 is in the ON state, the power supply terminal 5 is connected to the decoder 103. In contrast, when the drain switch FET 91 is in the OFF state, the power supply terminal 5 is disconnected from the decoder 103, and the statically consumed current Idd that flows through the decoder 103 from the power supply terminal 5 can be reduced. The semiconductor device 100 has a GaAs switch chip 110 in which the decoder 3, the power control circuit 109 and the switch circuit 2 are incorporated.

FIG. 4 shows the truth table of the semiconductor device according to the first embodiment of the present invention. Referring to FIG. 4, Input 1 through Input 3 denote signals applied to the input terminals 41 through 43, respectively. A symbol "H" denotes a high-level signal, and a symbol "L" denotes a low-level signal. The 3-to-8 bit decoder has eight different input logic states (LLL-HHH), and actually uses only six logic states. One of the remaining two unused input logic states is defined as the standby mode. In FIG. 4, the seventh condition is out of use, and the eighth condition is defined as the standby mode. RF1-Common through RF6-Common indicate the connecting relationships between the RF common terminal 7 and the RF terminals 81 through 86. A symbol "on" denotes a state in which the connection between the common terminal and the corresponding RF terminal is made, and a symbol "off" denotes a state in which the connection is not made.

The voltage Vdd applied to the power supply terminal 5 is used to drive the decoder 103, and may be equal to 3 V. The symbol Idd denotes the statically current consumed between the power supply terminal 5 and the ground terminal 6. For example, when the drain switch FET 91 is ON, the statically consumed current Idd equal to 1 mA flows through the decoder 103. In contrast, when the drain switch FET 91 is OFF, the statically consumed current Idd equal to 0.05 mA flows through the decoder 103. Although the current Idd as small as 0.05 mA is consumed even in the OFF state of the drain switch FET 91, it is much smaller than the current Idd as large as 1 mA in the ON state and is practically negligible. In this manner, power consumption can be improved.

The semiconductor device 100 operates as follows. In the normal mode, the input signals that define any of the first through sixth input conditions are applied to the input terminals 41 through 43, and are decoded by the decoder 103. The decoded signals are applied to the gates of the FETs 21 through 26 of the switch circuit 2. One of the FETs 21 through 26 is selected and the corresponding RF terminal is coupled to the common terminal 7 through the activated FET. In the normal mode, the drain switch FET 91 of the power control circuit 109 is ON, and the statically consumed current Idd as large as, for example, 1 mA flows through the decoder 103 as long as the power supply voltage as high as, for example, 1 V is applied to the power supply terminal 5.

In contrast, the semiconductor device 100 enters into the standby mode in response to the eighth condition defined by the input signals applied to the input terminals 41 through 43. The input signals are input to the logic circuit 93 of the power control circuit 109. The eight condition causes the logic circuit 93 to turn OFF the drain switch FET 91, and operatively disconnects the power supply terminal 5 from the decoder 103. Even when the power supply voltage of 3 V is applied to the power supply terminal 5, the statically consumed current Idd as small as lonely 0.05 mA flows through the decoder 103, and power in the standby mode can be saved.

According to the first embodiment of the present invention, the current consumed by the decoder 103 can be restrained and power can be saved by disconnecting the power supply terminal 5 from the decoder 103. This makes it possible to lengthen the call waiting time of the portable phone. The use of the power control circuit 109 connected in parallel with the decoder 103 avoids an increased number of input terminals and allows the conventional package to be continuously used. It should be noted that the conventional device is equipped with a specific control terminal provided specifically for power control in addition to the three input control terminals in order to externally control the gate of the drain switch FET by means of a specific power control IC separate from the semiconductor device of the switch module. However, the use of the specific control terminal increases the number of terminals, and the use of the specific power control IC complicates the entire configuration of the portable phone. This will increase the production cost.

Second Embodiment

Figure 5:
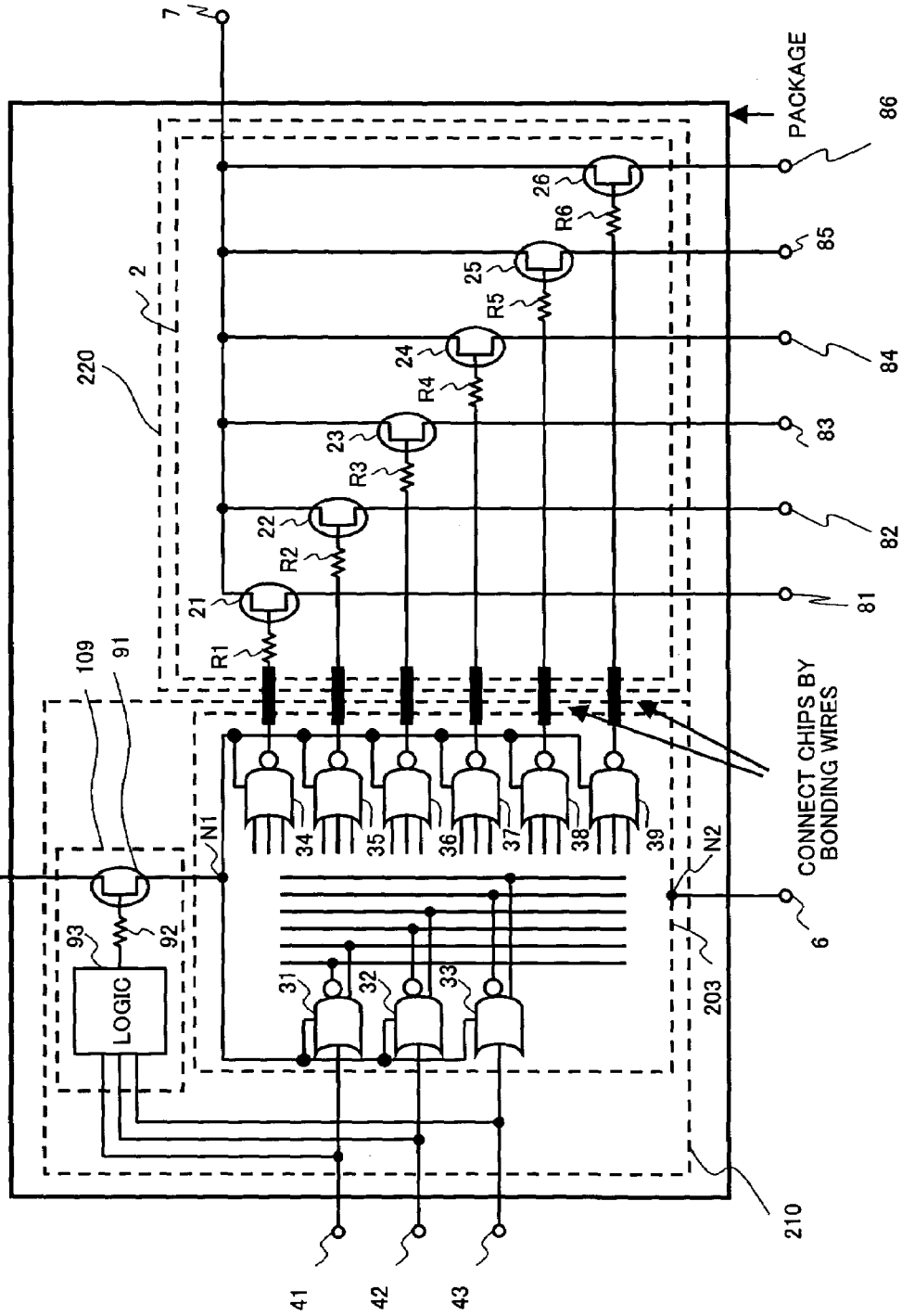
FIG. 5 is a block diagram of a semiconductor device according to a second embodiment of the present invention.

A second embodiment of the present invention will now be described. FIG. 5 is a block diagram of a semiconductor device according to the second embodiment of the present invention, in which parts that are the same as those shown in the previously described figures are given the same reference numerals as previously. Referring to FIG. 5, a semiconductor device 200 includes the switch circuit 2, a decoder 203, the input terminals 41 through 43, the power supply terminal 5, the ground terminal 6, the RF common terminal 7, the RF terminals 81 through 86, and a power control circuit 209. These structural parts may be incorporated into a single package.

The switch 2 includes the FETs 21 through 26, and resistors R1 through R6. The gates of the FETs 21 through 26 are controlled by the output signals of the decoder 203. The switch circuit 2 may be made of GaAs. The FETs 21 through 26 selectively connect the RF terminals 81 through 86 to the RF common terminal 7.

The decoder 203 includes the OR/NOR circuits 31 through 33 and the NOR circuits 34 through 39, and decodes the input signals received via the input terminals 41 through 43. The decoded signals are output from the NOR circuits 34 through 39. The decoder 203 may be formed by MOSFETs (Metal Oxide Semiconductor FETs). The decoder 203 formed by the MOSFETs is capable of further reducing the current Idd statically consumed in the decoder 203, as compared to the decoder formed by MESFETS. Generally, the logic using MOSFETs is implemented by CMOS. In the CMOS logic, a complementary operation is available in which only one of the pMOS transistor and the nMOS transistor between the power supply terminal 5 and the ground terminal 6 is turned ON, so that no pass-through current flows therebetween. Thus, the pass-through current does not flow the decoder 203 unless the logic changes.

The power control circuit 209 includes the drain switch FET 91, the resistor 92 and the logic circuit 93. Like the decode 203, the power control circuit 209 is formed by MOSFETs. It is thus possible to prevent the current from flowing through the decoder when the drain switch MOSFET 91 is OFF and further reduce the statically consumed current Idd.

The semiconductor device 200 according to the second embodiment has a chip 210 named MOS decoder chip on which the decoder 203 and the power control circuit 209 are formed. The switch circuit 2 is formed on another chip 220, named GaAs switch chip. Bonding wires are used to make connections between the MOS decoder chip 210 and the switch chip 220.

The semiconductor device 200 operates as follows. In the normal mode, the input signals that defines one of the first to sixth conditions are applied to the input terminals 41 through 43, and are decoded by the decoder 203. The decoded signals are applied to the gates of the FETs 21 through 26 of the switch circuit 2. One of the RF terminals 81 through 86 is selectively connected to the RF common terminal 7 via the selected FET. In the normal mode, the drain switch FET 91 of the power control circuit 209 is ON, and the statically consumed current Idd equal to, for example, 0.1 mA flows through the decoder 203 with the voltage 3 V being applied to the power supply terminal 5.

In the standby mode, the input signals that define the eighth condition are applied to the logic circuit 93 via the input terminals 41 through 43. The logic circuit 93 produces the corresponding control signal, which turns OFF the drain switch FET 91 and disconnects the power supply terminal 5 from the decoder 203. Even when the power supply voltage of 3 V is applied to the power supply terminal 5, the statically consumed current that flows through the decoder 203 is reduced to, for example, 0.005 mA. Thus, the power consumption in the standby mode can be improved.

According to the present invention, the decoder 203 is formed by MOSFETs, and the current Idd statically consumed in the decoder 203 can be further reduced, as compared to the decoder formed by MESFETs. This reduces power consumption and lengthens the call waiting time of the portable phone.

Third Embodiment

Figure 6:
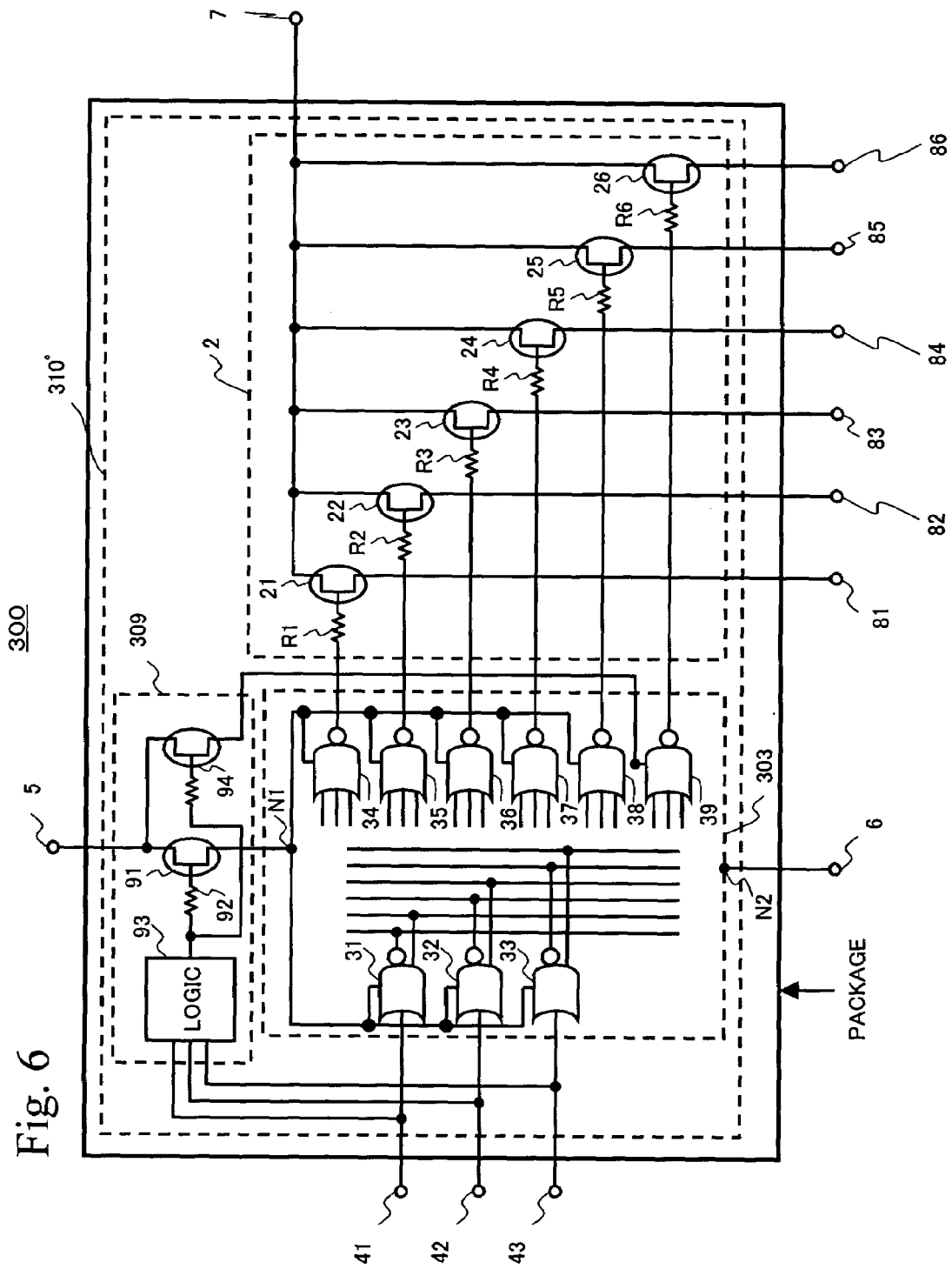
FIG. 6 is a block diagram of a semiconductor device according to a third embodiment of the present invention.

FIG. 6 is a block diagram of a semiconductor device according to a third embodiment of the present invention, in which parts that are the same as those shown in the previously described figures are given the same reference numerals as previously. Referring to FIG. 6, a semiconductor device 300 includes a decoder 303, the input terminals 41 through 43, the power supply terminal 5, the ground terminal 6, the RF common terminal 7, the RF terminals 81 through 86, and a power control circuit 309. These structural parts are incorporated into a package. The switch circuit 2 includes the FETs 21 through 26, and the resistors R1 through R6. The gates of the FETs 21 through 26 are controlled by signals from the decoder 303. One of the RF terminals 81 through 86 may be connected to the RF common terminal 7 via the selected one of the FETs 21 through 26.

The decoder 303 includes the OR/NOR circuits 31 through 33, and the NOR circuits 34 through 39. The decoder 303 decodes the input signals applied via the input terminals 41 through 43, and outputs decoded control signals from the NOR circuits 34 through 39. The power control circuit 309 includes two drain switches 91 and 94, the resistor 92 and the logic circuit 93. The power control circuit 309 includes the power supply terminal 5 and multiple switch means for disconnecting the power supply terminal 5 from the decoder 303.

The power control circuit 309 is connected in parallel between the input terminals 41 through 43 and the decoder 303, and selectively disconnects the power supply terminal 5 from the decoder 303. Bonding wires may be used to make the above parallel connection. The drain of the drain switch FET 91 is connected to the power supply terminal 5, and the source is connected to the decoder 303, the gate being connected to the logic circuit via the resistor 92. The drain and gate of the drain switch FET 94 are commonly connected to those of the drain switch FET 91, and the source is connected to the decoder 303. With this arrangement, the drain switch FETs 91 and 94 may be controlled by a common control signal.

The RF terminals 81 through 86 may be assigned to transmission or reception. Part of transmission power may leak to the decoder 303 from the switch FETs 21 through 26 on the transmission side. The leaked power enters the drain switch FET 91 via the output terminal of the decoder 303 and into another switch FET, and may cause unstable operation. However, the power control circuit 309 equipped with the two drain switch FETs 91 and 94 is capable of avoiding passage of leaked power.

The logic circuit 93 generates control signals for the controlling the gates of the drain switch FETs 91 through 94 by using unused input condition among the conditions defined by the combination of the input signals applied to the input terminals 41 through 43. When the drain switch FETs 91 and 94 are both ON, the power supply terminal 5 is connected to the decoder 303. When the drain switch FETs 91 and 94 are OFF, the power supply terminal 5 is disconnected form the decoder 303, and the current Idd statically consumed in the decoder 303 can be reduced. The semiconductor device 300 has a single chip, named GaAs switch chip 310 on which the decoder 303, the power control circuit 309 and the switch circuit 202 are formed.

According to the third embodiment of the present invention, it is possible to realize stable operation even if power leakage from the switch FETs takes place. The power control circuit 309 may be applied to the second embodiment.

Fourth Embodiment

Figure 7:
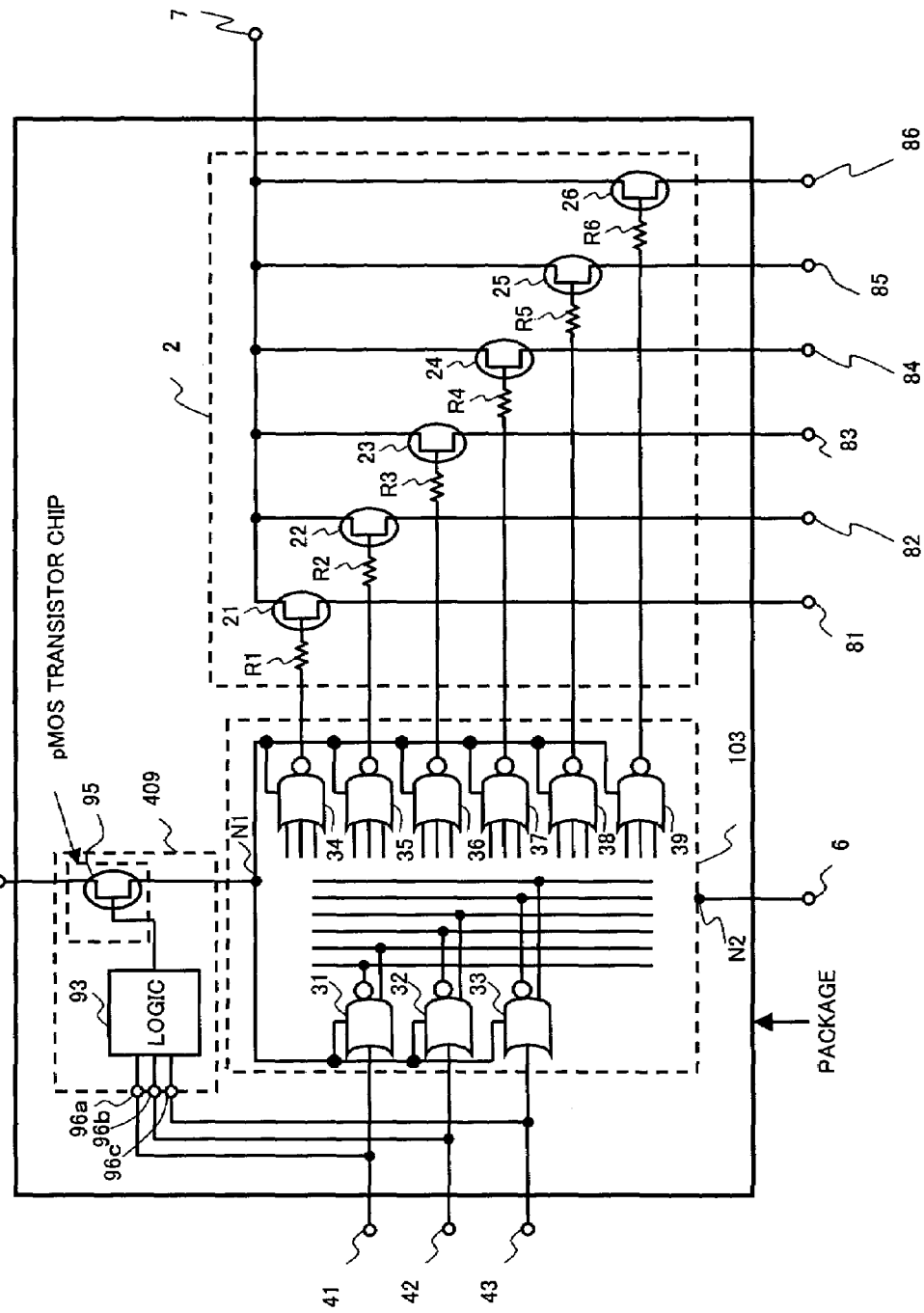
FIG. 7 is a circuit diagram of a semiconductor device according to a fourth embodiment of the present invention.

FIG. 7 is a block diagram of a semiconductor device according to a fourth embodiment of the present invention, in which parts that are the same as those shown in the previously described figures are given the same reference numerals as previously. A semiconductor device 400 includes the switch circuit 2, the decoder 103, the input terminals 41 through 43, the power terminal 5, the ground terminal 6, the RF common terminal 7, the RF terminals 81 through 86, and a power control circuit 409. These structural parts may be incorporated into a package.

The power control circuit 409 includes the logic circuit 93, a drain switch 95, and terminals 96a through 96c. These terminals 96a through 96c are connected in parallel with the input terminals 41 to 43 of the decoder 103. The drain switch 95 may be a pMOS transistor formed on a chip. That is, the drain switch 95 may be provided outside of the package. The power control circuit 409 is formed on a chip separate from the chip of the decoder 103, and is connected to the decoder 103. Even in this case, the power control circuit 409 and the decoder are incorporated into the same package. It should be appreciated that the present embodiment has the same number of external input terminals controlled by an external IC as that used in the other embodiments.

The pMOS transistor has a small ON resistance. Thus, a small voltage drop develops across the drain switch 95 of the pMOS transistor, as compared to the first embodiment with the GaAs drain switch having a comparatively high ON resistance. Thus, the decoder 103 can be supplied with the power supply voltage having little voltage drop, which makes it possible to raise the high level very close to the power supply voltage actually applied to the power supply terminal 5. It is thus possible to improve the power durability of the switch.

The semiconductor devices of the first through fourth embodiments may be fabricated by a method including the steps of: mounting, in a package, a decoder, input terminals of the decoder, and a power control circuit selectively disconnecting a power supply terminal supplied with a power supply voltage used to drive the decoder from the decoder; and bonding wires to connect the power control circuit in parallel between the input terminals of the decoder and the decoder.

The semiconductor devices of the first through fourth embodiments may be controlled by a control method of including the steps of: applying multiple input signals to a decoder connected between a power supply terminal supplied with a power supply voltage and a ground terminal; and generating control signals used to control switch means provided for selectively disconnecting the passage between the power supply terminal and the ground terminal.

In the control of the power saving mode of devices such as portable telephones including the semiconductor device, the decoder is supplied, via the input terminals 41-43, with the input signals that instruct the semiconductor device to shift to the power saving or standby mode based on the given combination of the input signals indicating reduction or cutoff in the power supply voltage. It is thus possible to reduce power consumed in the decoder.

The aforementioned embodiments are directed to the decoder applied to the antenna switch of the portable phone. The present invention may be applied to switching between filters having different characteristics. The semiconductor devices of the aforementioned embodiments may be incorporated into the communications apparatuses as switch modules. The present invention does not need any additional terminals. Such additional terminals increase the total number of terminals on the package and need software built in an external IC that generates the control signal for controlling power saving.

The present invention is not limited to the specifically disclosed embodiments, but various variations and modifications may be made within the scope of the claimed invention. The power control circuit according to the present invention may be a circuit that shuts down or cut off power supply or a circuit that reduces the power supply voltage. The reduced voltage may be applied to the power supply terminal 5 rather than shutdown.

The present invention is based on Japanese Patent Application No. 2004-235552 filed on Aug. 12, 2005, the entire disclosure of which is hereby incorporated by reference.

What is claimed is:

1. A semiconductor device comprising:
   a decoder decoding input signals having given combinations and generating a corresponding output signal;
   a power control circuit reducing a supply of power to the decoder when detecting at least one of the given combinations of the, input signals applied to the decoder; and
   a switch circuit composed of switching transistors that selectively connect a first terminal and plurality of second terminals and are controlled by the output signal of the decoder.

2. The semiconductor device as claimed in claim 1, wherein the power control circuit has input terminals connected in parallel with the input terminals of the decoder, and the power control circuit reduces the supply of power when detecting an input applied to the input terminals of the power control circuit.

3. The semiconductor device as claimed in claim 1, wherein reducing the supply of power by the power control circuit is implemented by disconnecting a power supply terminal of the decoder and the decoder from each other.

4. The semiconductor device as claimed in claim 3, wherein the power control circuit comprises at least one switch that disconnects the power supply terminal and the decoder from each other.

5. The semiconductor device as claimed in claim 4, wherein the power control circuit comprises a circuit that generates a signal for controlling said at least one switch.

6. The semiconductor device as claimed in claim 4, wherein the power control circuit comprises a circuit that generates, based on the given combinations of the input signals applied to the input terminals of the decoder, a signal for controlling said at least one switch.

7. The semiconductor device as claimed in claim 4, wherein the power control circuit comprises a circuit that generates, based on the given combinations of the input signals applied to the input terminals of the decoder, the common control signal from the input signals applied to the decoder.

8. The semiconductor device as claimed in claim 3, wherein the power control circuit comprises multiple switches that disconnect the power supply terminal and the decoder, and the multiple switches include first and second switches controlled by a common control signal.

9. The semiconductor device as claimed in claim 8, wherein the power control circuit comprises a circuit that generates the common control signal.

10. The semiconductor device as claimed in claim 1, wherein the power control circuit is connected between the input terminals of the decoder and the decoder by bonding wires or metal interconnection lines.

11. The semiconductor device as claimed in claim 1, wherein the decoder, the power control circuit and the switch circuit are formed on a single chip or separate chips.

12. The semiconductor device as claimed in claim 1, wherein the decoder and the power supply circuit are formed on a chip, and the switch circuit is provided on another chip, which is connected to the chip by bonding wires.

13. The semiconductor device as claimed in claim 1, wherein the decoder and the power control circuit are formed on a single chip or separate chips.

14. A method of controlling a semiconductor device having a decoder receiving input signals having given combinations and generating a corresponding output signal, and a switch circuit composed of switching transistors that selectively connect a first terminal and a plurality of second terminals are controlled by the output signal of the decoder, said method comprising the steps of:
   detecting at least one of the given combinations of the input signals applied to the decoder; and
   reducing a supply of power to the decoder when said at least one of the given combinations of the input signals is detected.

* * * * *